Figure 3:
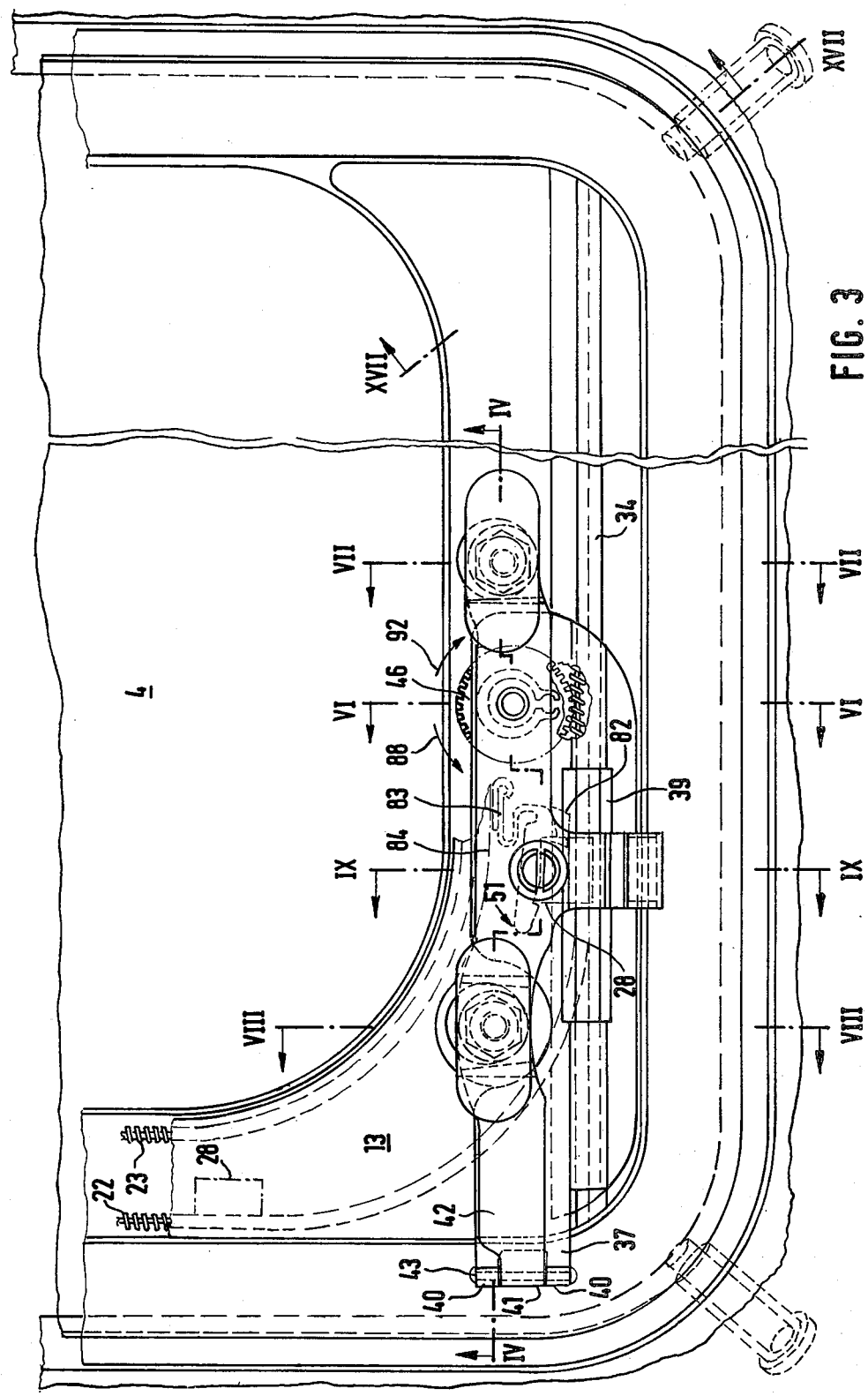

United States Patent [19]

Grimm et al.

[11] Patent Number: 4,475,767
[45] Date of Patent: Oct. 9, 1984

[54] SLIDING ROOF FOR AUTOMOBILES

[75] Inventors: Rainer Grimm, Wetzlar; Horst Bohm, Frankfurt am Main; Peter Schafer, Maintal, all of Fed. Rep. of Germany

[73] Assignee: Rockwell-Golde GmbH, Fed. Rep. of Germany

[21] Appl. No.: 437,669

[22] Filed: Oct. 29, 1982

[30] Foreign Application Priority Data

Nov. 26, 1981 [DE] Fed. Rep. of Germany ....... 3146905

[51] Int. Cl.³ .............................................. B60J 7/04
[52] U.S. Cl. .................................... 296/221; 296/222
[58] Field of Search .............. 296/221, 216, 222, 223, 296/224

[56] References Cited

U.S. PATENT DOCUMENTS 4,089,557 5/1978 Leiter .................................. 296/221
4,407,541 10/1983 Boots .................................. 296/221

FOREIGN PATENT DOCUMENTS 2950453 6/1981 Fed. Rep. of Germany .
1435387 5/1976 United Kingdom .

Primary Examiner—Robert R. Song

[57] ABSTRACT

A sliding roof for automobiles, comprising a raisable lid associated with a roof opening, which lid is pivotally journalled in the region of its forward edge about a horizontal axis oriented transversely to the direction of travel, is supported slidably on lateral guide rails on the forward third of its length and thereby can be displaced partly over the rear, fixed roof surface in its raised position while maintaining its raised angle, a raising device consisting of a threaded telescopic device participating displacements being provided in the region of the support on each side of the lid, the threaded nut of which is connected rotationally locked with a pinion coaxial therewith, which is in engagement with a threaded cable, journalled displaceably in tension and compression transmitting manner, of a drive device.

20 Claims, 18 Drawing Figures

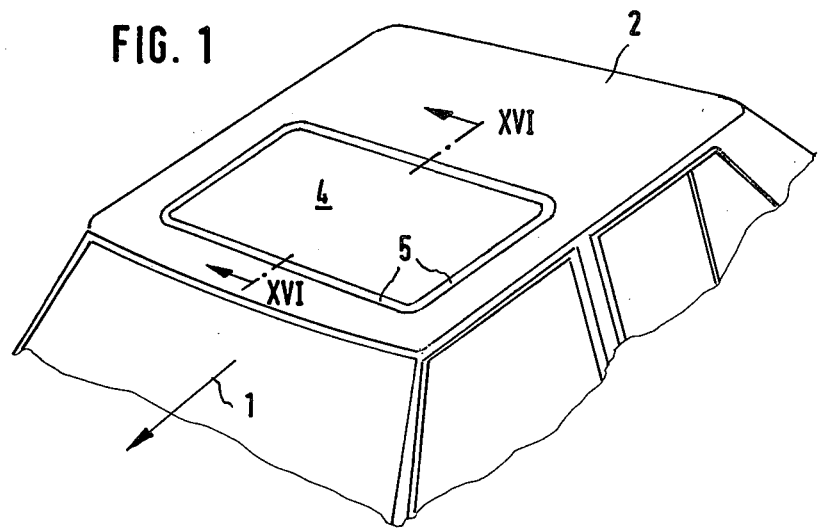
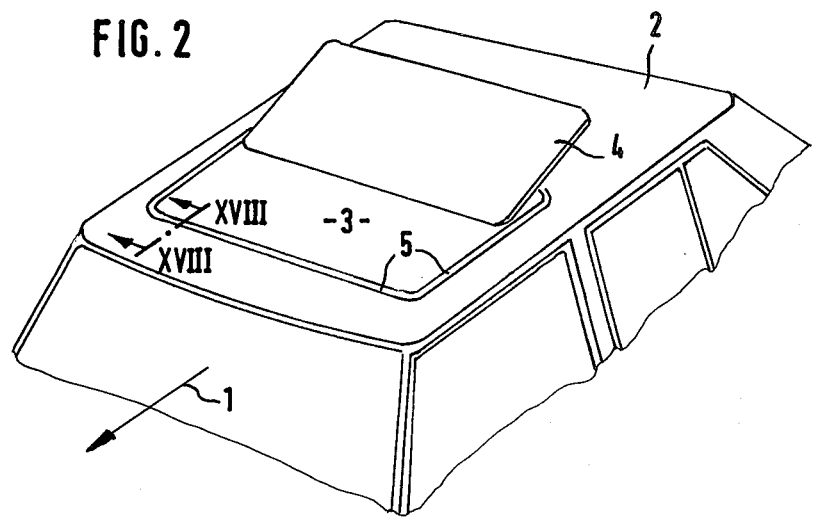

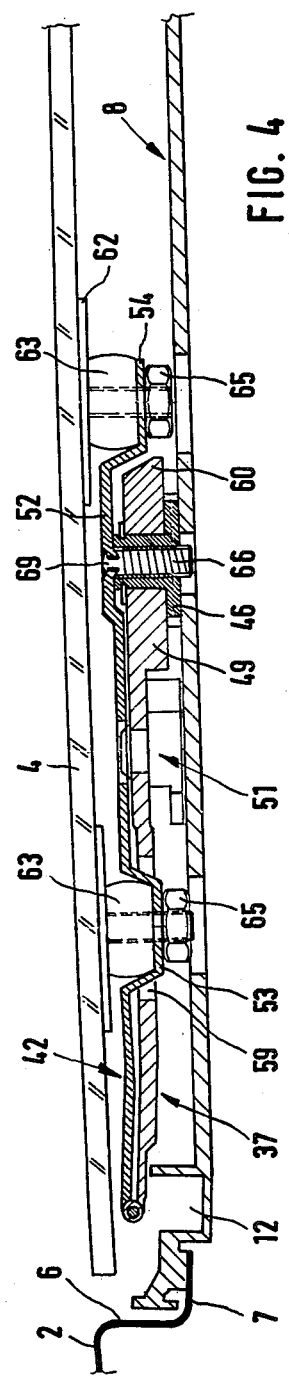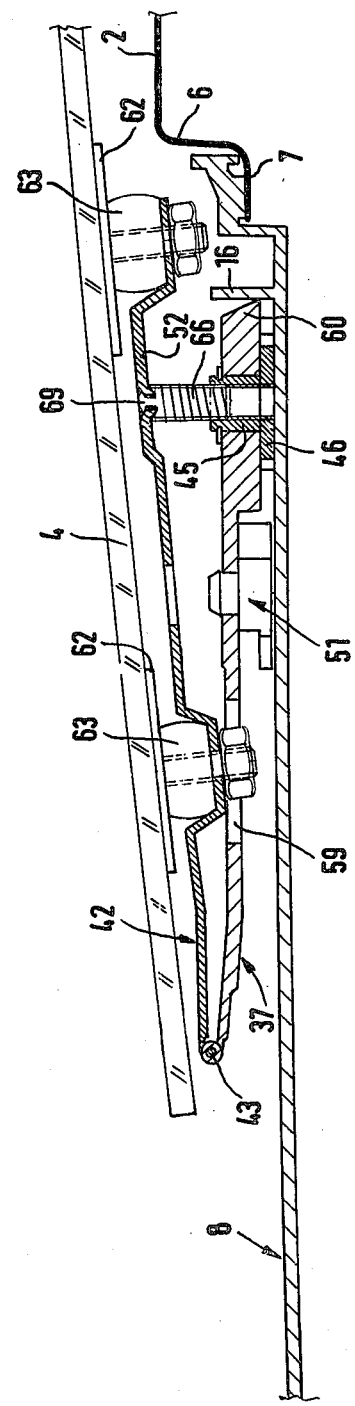

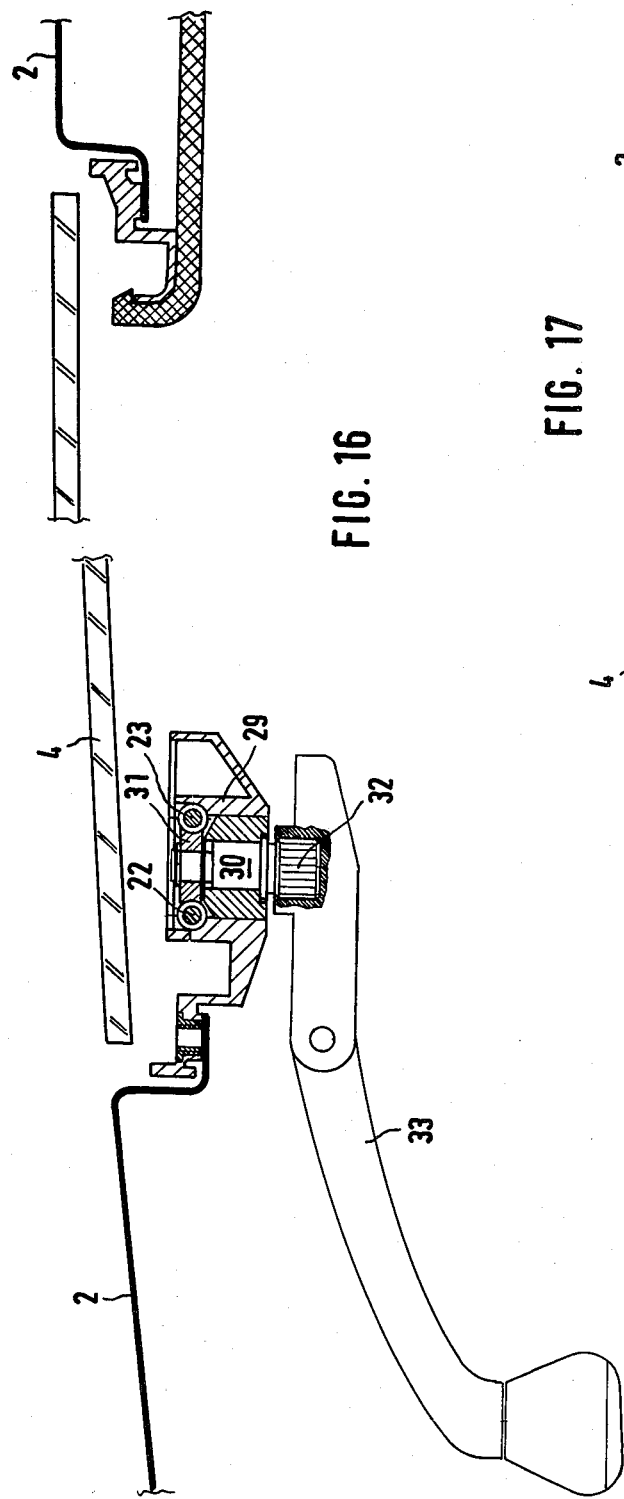
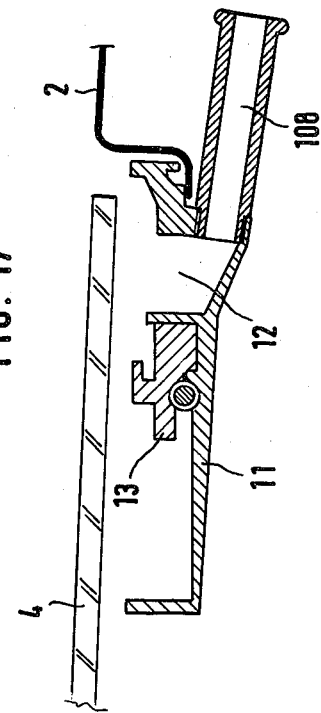
FIG. 16
FIG. 17

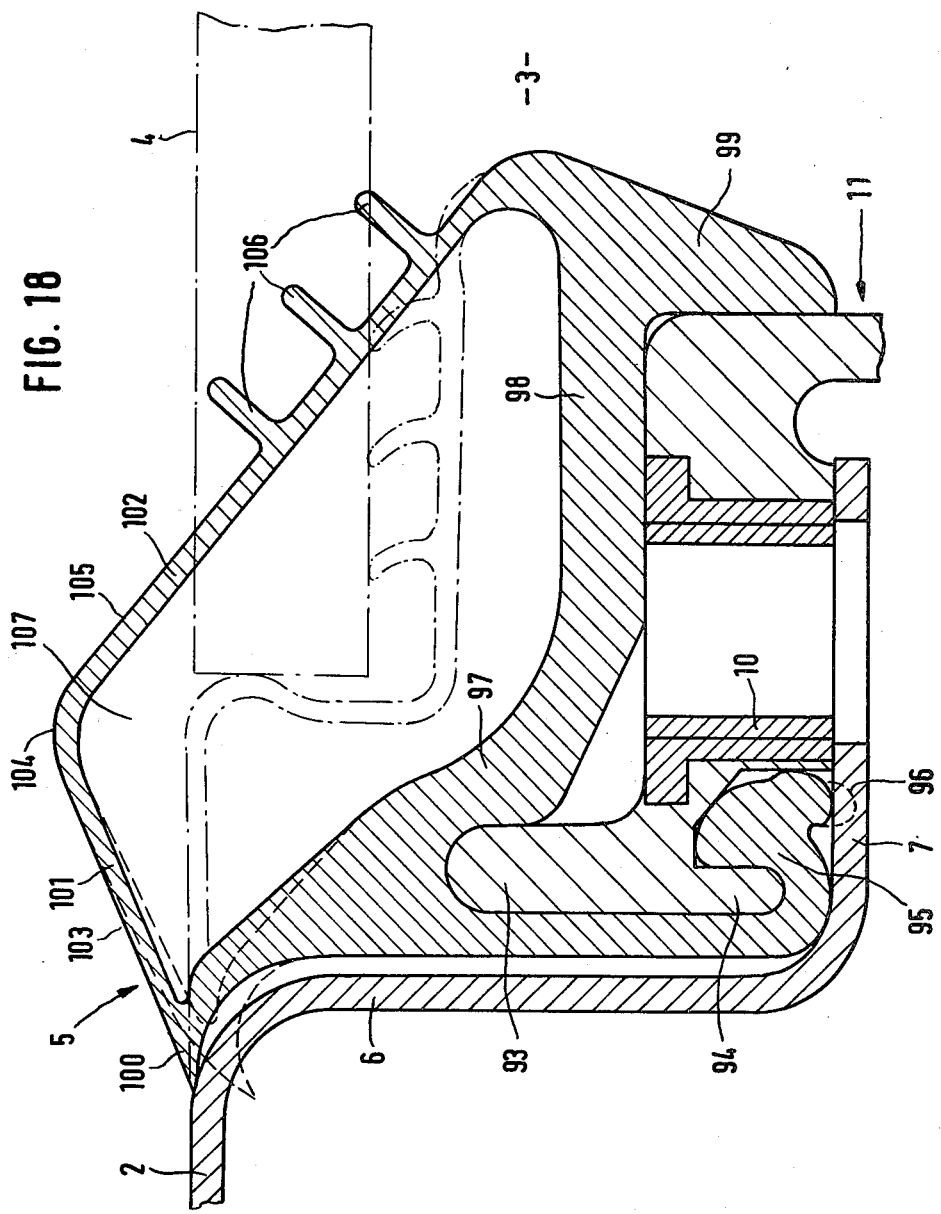

SLIDING ROOF FOR AUTOMOBILES

This invention relates to a sliding roof for automobiles, comprising a raisable lid associated with a roof opening, which lid is pivotally journalled in the region of its forward edge about a horizontal axis oriented transversely to the direction of travel, is supported slidably on lateral guide rails in the forward third of its length and thereby can be displaced partly over the rear, fixed roof surface in its raised position while maintaining its raised angle, a raising device consisting of a threaded telescopic device participating in displacements being provided in the region of the support on each side of the lid, the threaded nut of which (raising device) is connected rotationally locked with a pinion coaxial therewith, which is in engagement with a threaded cable, journalled displaceably in tension and compression transmitting manner, of a drive device.

In a known sliding roof of this type (DE-OS No. 29 50 453), the lid bears in the forward third of its length at two spaced apart positions on each guide rail, namely firstly via a slide shoe assembly fitted to its forward pivot bearing and secondly via a slide shoe fixed to the raising device, which shoe is supported in the guide rail tiltable by a limited amount for permitting compensation of the pivoted length. On the basis of these measures the lid is guided with appreciable clearance, so that a fixed condition of the lid in the raised position is difficult to achieve. The drive device equipped with a hand crank is situated forward on the lid, and therefore participates in all displacement movements and actuates only the two raising devices. The displacing of the lid must therefore be undertaken directly by hand, it being necessary to overcome the resistance of detent marks acting upon the sliding shoes of the raising device, these marks being intended for preventing unintentional displacements of the raised lid during deceleration of the automobile. The sliding actuation of the lid is thereby rendered very difficult and moreover can only be effected within the steps specified by the detent marks. In particular after unavoidable wear the detent marks are no longer capable of reliably holding the lid in the set displaced position when the vehicle decelerates, or at any rate the lid can oscillate between adjacent detent marks. A further disadvantage in the known sliding roof is the lack of a height adjustment facility for the lid.

The task underlying the present invention is to construct a sliding roof of the initially described category so that it can be operated reliably and conveniently and is simple in construction and installation, while avoiding the aforementioned disadvantages. In particular, the lid shall have a firm position in all raised and slid positions, both its raising movement and also its displacement movement shall be controlled by a single drive device, and its displaced positions shall be infinitely adjustable and reliably secured against unintentional displacement.

The stated task is achieved according to the present invention, starting from the initially defined category, in that, for supporting the lid, on each side of the lid a slide rail engaging displaceably with the guide rail is provided, the forward end of which (slide rail) is connected, for forming the horizontal axis oriented transversely to the direction of travel, pivotally with a raising lever disposed in the direction of the slide rail and to which the lid is fixed, and at the rear end of which (slide rail) the threaded nut of the raising device is journalled rotatable about a vertical axis, the lifting element of the raising device being connected with the raising lever, and in that a coupling element is pivotally mounted on the slide rail, which element is situated with actuating surfaces in the movement path of an entraining device connected with the threaded cable and engages, in the forward position of the lid, into a stationary blocking recess.

In the sliding roof of this invention, the lid is supported in its forward region on each side only by the slide rail on the associated guide rail, the lid bearing at two separated positions on the slide rail, namely on the one hand at the forward pivot axis and on the other hand at the rear on the slide rail vai the raising device situated between slide rail and raising lever. In this manner, on account of the large guiding support length between guide rail and slide rail, a guiding of the lid with very little play is obtained, which creates the precondition for a firm position of the lid. The slide rail, the raising lever and the raising device here constitute one stable unit which, in raised positions, adopts the form of a wedge or of a triangle with apex angle variable by the raising device. The threaded cable here undertakes both the lifting drive of the raising device and also the sliding drive of the lid. In the forward position of the lid, the lid is prevented by the engagement of the coupling element into the blocking recess from displacements, so that the displacing threaded cable, via the engagement with the pinion in this position of the lid, actuates only the raising device. The entraining device, in co-operation with the coupling element and the blocking recess, provides for the cancelling of the blocking engagement and the displacement coupling between slide rail and the components connected therewith and the threaded cable. Entraining device, coupling element and blocking recess correspondingly co-operate also when the blocking engagement is re-established and the displacement coupling between slide rail and threaded cable is cancelled. When a stationary blocking recess is mentioned here, this means that this blocking recess is situated in a stationary position relative to the components participating in the sliding movement. The described, firm condition of the lid is retained in every displaced position of the lid, because during the displacement the elements which support the lid on either side in wedge-shaped pattern participate in the displacement movement. Since the displacement movement is caused by the drive of the threaded cable, the displaced positions of the lid can be infinitely adjusted. An unintentional displacement of the raised lid is impossible, because in all displaced positions the entraining device is force-transmittingly connected with the coupling element and the drive device does not permit an unintentional displacement of the threaded cable.

A particularly simple and easily installed sliding roof construction is achieved if the guide rails are constituted as the upper part of a roof frame surrounding the roof opening and divided in a horizontal plane in the region of the guide channels for the threaded cables, and possess, on their guide and support surfaces for the slide rails, back-cut guide ribs for engagement with correspondingly back-cut guide grooves situated on the slide rails. By the horizontal dividing of the guide channels for the threaded cables, transitionless guide channels with smooth walls are obtained, in which the threaded cables can slide noiselessly and without trouble. By the back-cut engagement between the guide rails and the slide rails with simultaneously large area of support of the guide rails and the slide rails one to the other, an excellent displacement bearing, involving little play, is obtained for the slide rails.

It is advantageous for the stability of the assembled roof frame if upper part and lower part of the roof frame are form-fittingly and preferably detachably connected together by integrally formed projections and depressions, a peripheral projection of the lower part moreover separating the upper part and all functional components from a peripheral water channel, integrally formed into the lower part and situated between the edge of the roof opening and the peripheral projection. In this manner not only is clamping together of upper and lower parts of the roof frame achieved, but at the same time assurance is provided that the functional parts are separated in corrosion preventing manner from the water channel.

Upper and lower parts of the roof frame are advantageously formed of plastics material. The roof frame is therefore light and, on account of the profiling directly moulded into it, possesses extremely light stiffness, which is the precondition for trouble-free functioning of the sliding roof. Furthermore, the use of plastics permits favourable friction values relative to metal functional components, with the result that the sliding roof according to this invention can be actuated extremely easily and correspondingly conveniently. By the horizontal dividing of the roof frame in conjunction with the slide rails and raising levers likewise constructed of flat form, an extremely flat sliding roof construction is obtained of somewhat more than 20 mm depth, which reduces the headroom inside the vehicle by only a very small amount and nevertheless, due to the construction of its components according to this invention, exhibits high stability and functional reliability.

An especially simple and effective height adjustment facility of the lid is achieved if the lid is fixed to each of the two raising levers at two spaced apart points through the intermediary of elastic height adjustment elements. The lid is thus held at a total of 4 points, which can be adjusted in height independently of one another by greater or lesser elastic compression of the height adjustment elements.

Helical compression springs, for example, are suitable for such elastic height adjustment elements, but the arrangement is preferably such that the elastic height adjustment elements are constructed as buffers made of an elastomeric material, each of which is traversed by a threaded pin fixed to the lid, which passes through a corresponding bore in the raising lever and carries an adjustment screw bearing against the raising lever on the side remote from the buffer. By simply rotating the preferably self-locking nuts, the adjustment in height of the lid can be regulated, the buffers being elastically deformed to a greater or lesser extent.

In pursuance of the concept of this invention, the threaded nut of the raising device has a rotationally symmetrical external periphery, is rotatably inserted into a corresponding bore of the slide rail, carries at its lower end the preferably integrally formed pinion, bearing from below against the guide rail and engaging with the associated threaded cable, and is secured at its upper end against axial displacements relative to the bore. The lifting element of the raising device is here a threaded pin screwed into the threaded nut, the free end of which pin projects through a bore of the raising lever and is fixed thereto. In this manner, the raising device constitutes a height-adjustable but nevertheless firm connection between the slide rail and the raising lever, which ensures that the triangular structure composed of slide rail, raising lever and raising device, during the raising actuation of the raising device, is braced to a certain extent to stiffen it, which imparts to the lid a very firm, supported condition. The fixing of the threaded pin to the raising lever is advantageously such that the free end of the threaded pin is stepped back, penetrates with a neck portion of smaller diameter through the larger diameter bore of the raising lever and terminates in a head, which bears against the raising lever to provide a limited, sluggish pivoting capability. Advantageously the raising lever possesses in the region of the bore a spherical cup-shaped pressed in zone, against which there bears on the one side a correspondingly formed end surface of the threaded pin and on the other side a correspondingly formed surface of the head.

Advantageously, the arrangement is such that the raising lever engages in the manner of a hook beneath the slide rail with a stop, opposite to which is a stop on the slide rail limiting the maximum raised travel. In this manner assurance is provided that the maximum raised travel is positively marked by stops, which prevent a further actuation of the drive device beyond the maximum raised position of the lid.

In pursuance of the concept of the invention, the coupling element is spring-loaded towards engagement into the stationary blocking recess. This measure ensures that the coupling element, when in a position opposite to the blocking recess, automatically brings about a blocking of sliding.

The coupling element may advantageously be so constructed that it engages from below by a cylindrical stub into a corresponding bore of the slide rail pivotally about an axis parallel to the threaded nut of the raising device and is constructed as a two-armed lever, which possesses at each end a hook projection pointing towards the associated threaded cable, the mutually facing surfaces of these hook projections being situated in the movement path of the rectangularly shaped entraining device, fixed with one of its longer rectangle sides to the threaded cable and parallel thereto, and enclosing between them two fixing surfaces meeting obtuse-angled at an apex, of which one actuating surface each bears against the free, longer rectangle side of the entraining device in two possible pivoted positions of the coupling element when the coupling element is in engagement with the entraining device.

One of the two projections is shaped for form-fitting engagement into the blocking recess and possesses a run-on surface, with which is associated the external corner of the blocking recess situated in the direction of the opening displacement of the lid, for pivoting the coupling element.

For the spring loading of the coupling element, a stirrup spring is advantageously fixed thereto, which, at least opposite to the blocking recess, bears against a projecting surface of the roof frame lower part parallel to the direction of sliding. The stirrup spring can also be constructed in one piece with the coupling element.

To complete the sliding roof construction, the lower part of the roof frame is equipped, at its edge towards the edge of the roof opening, with a peripheral fixing flange for a peripheral edge gap seal to be fixed in clamped manner thereon.

For achieving a reliable sealing, it is advantageous if the edge gap seal is a hollow profile formed from an elastomer material, the wall regions of which towards the fixing flange and the roof frame are constructed thickened, while the outer wall regions towards the lid are thin-walled and, in the uncompressed state, are outwardly bulged as viewed in cross-section to the form of a roof, the outer roof surface adjoining with a sealing lip to the fixed roof surface of the automobile and, from this point onwards, extending in the manner of a wind deflector obliquely upwards to a ridge zone, which is followed by the inner roof surface descending to the roof opening. In this manner, the edge gap seal which automatically bulges outwards when the lid is opened, acts as a wind deflector integrated into the seal, and which moreover is disposed all around the roof opening. The roof opening is thereby protected all around against the penetration of water and incident wind.

With the lid closed, the edge gap seal is compressed by the lid, the outer roof surface being situated approximately in the plane of the fixed roof surface of the automobile and of the lid, the ridge zone bearing against the edge surfaces of the lid, and the inner roof surface bearing against the lower side of the lid in the edge zone of the lid. Advantageously, the inner roof surface can here possess peripheral ribs or the like, which bear against the closed lid from below and further improve the sealing effect.

Figure 6:
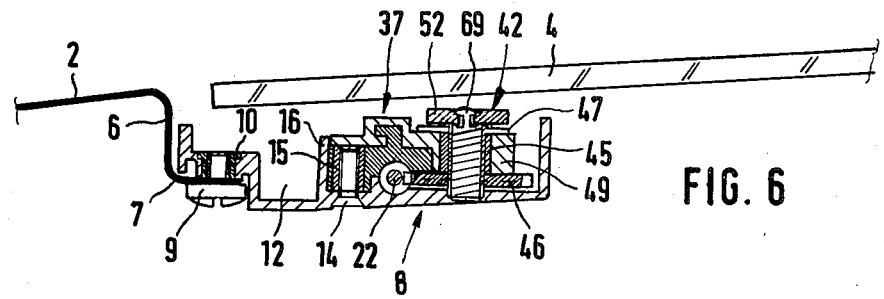
Figure 7:
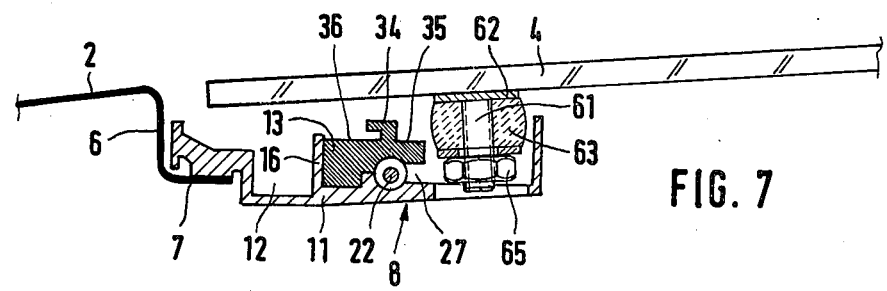
Figure 8:
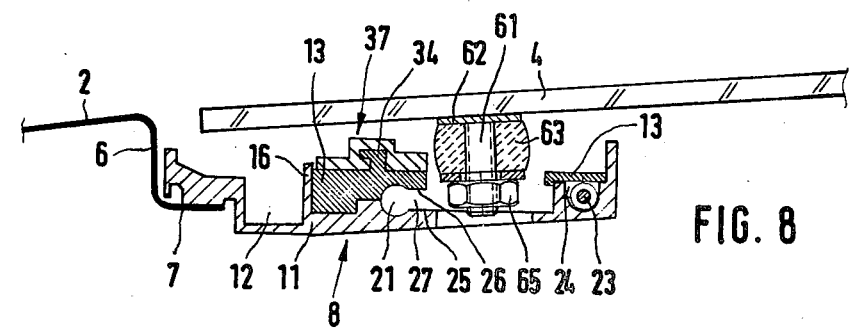
Figure 9:
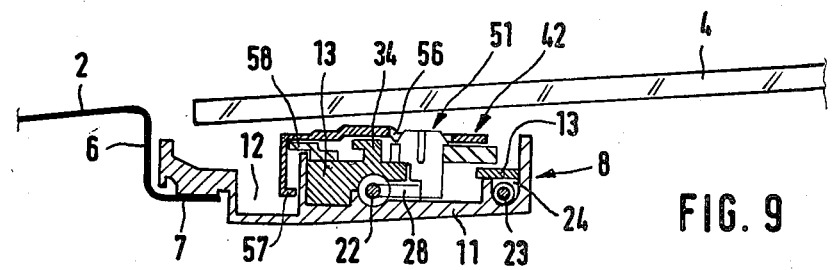
Figure 10:
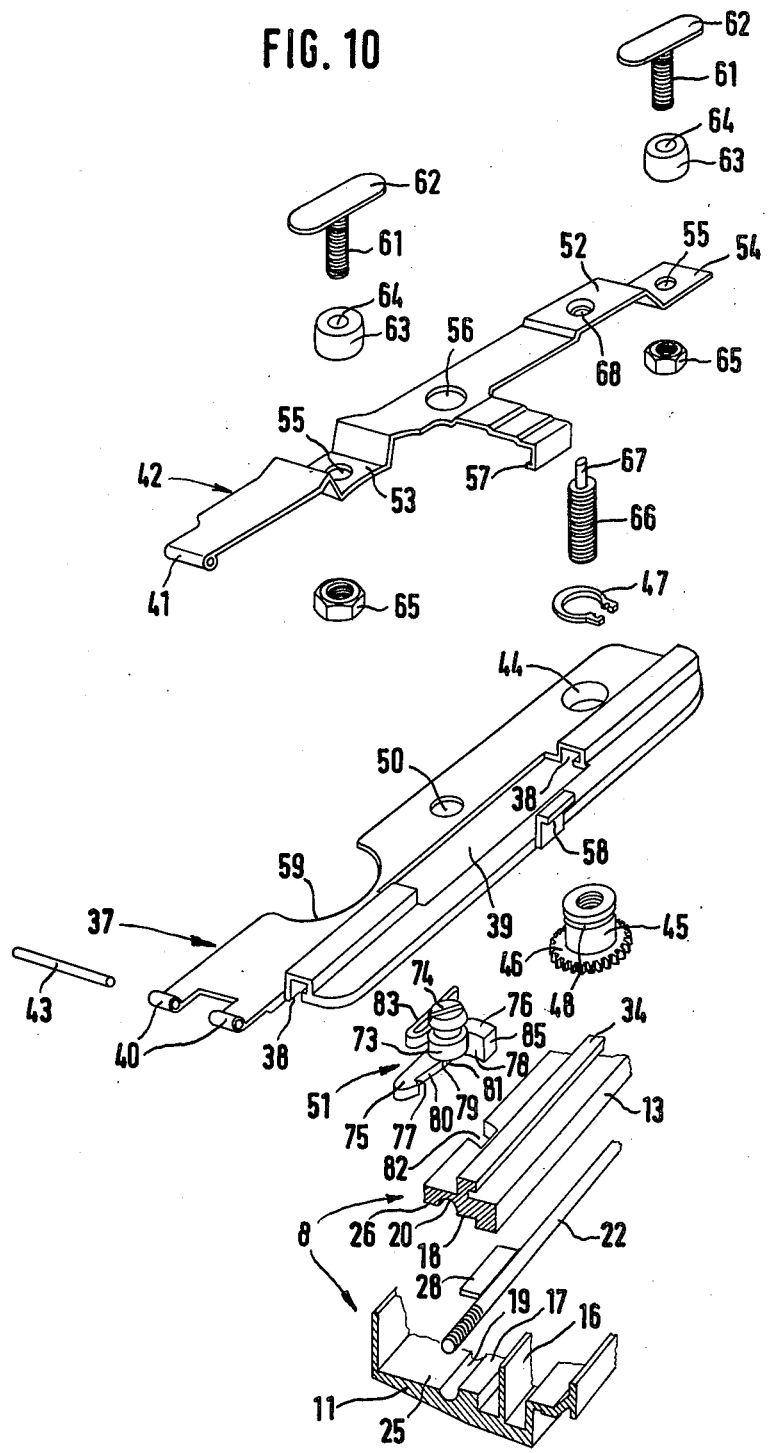
Figure 11:
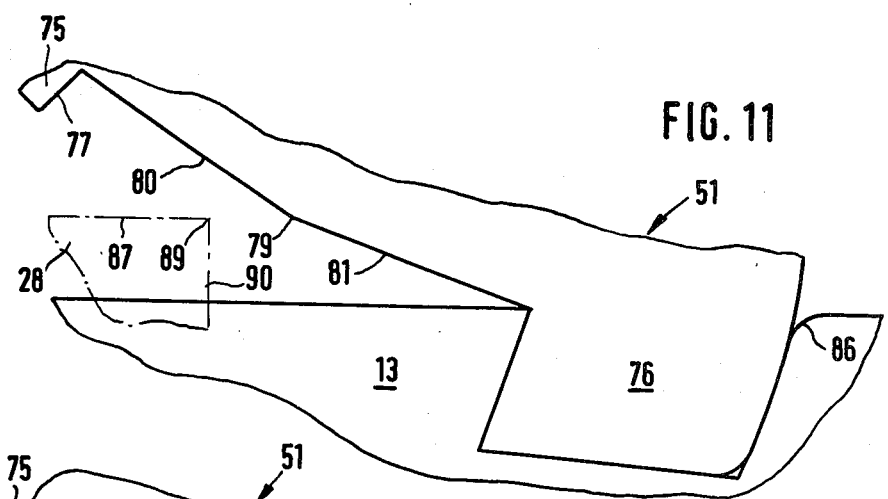
Figure 12:
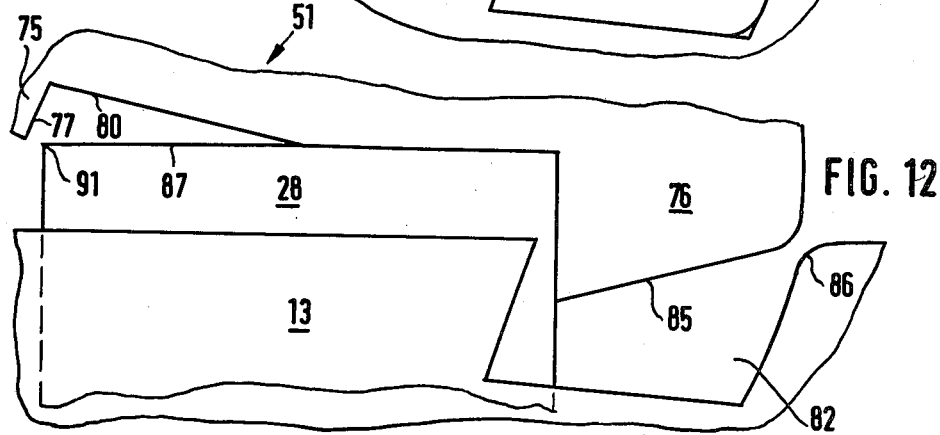
Figure 13:
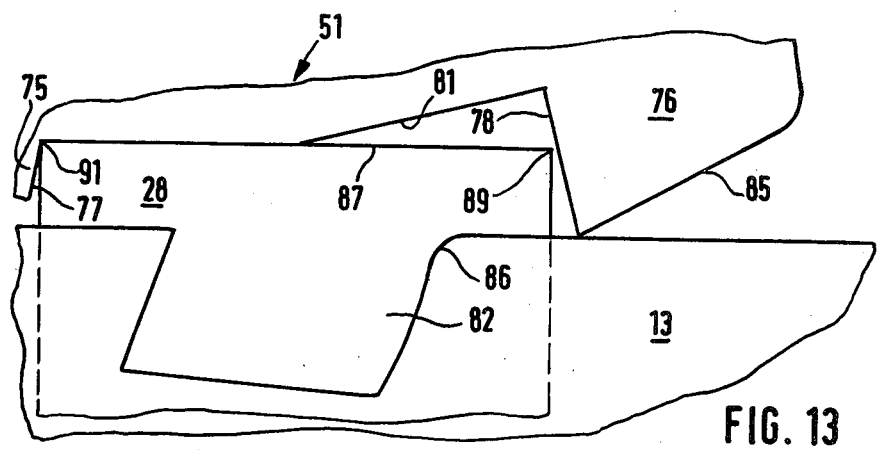
Figure 14:
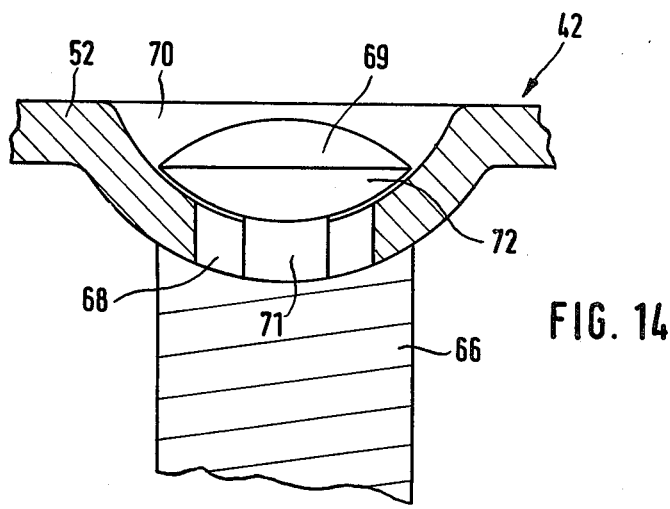
Figure 15:
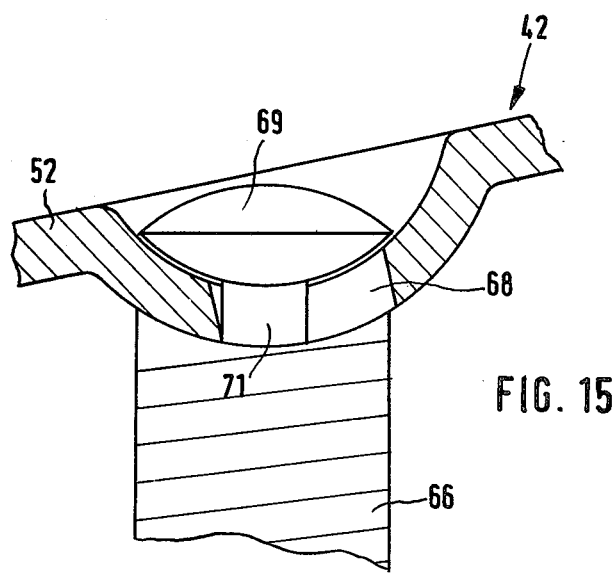

Further details of the invention are explained in more detail below with reference to the partly schematic drawings which illustrate examples of embodiment thereof. The drawings show:

FIG. 1 in perspective view the roof of an automobile with closed sliding roof,

FIG. 2 the automobile roof according to FIG. 1, but with the lid raised and displaced to the maximum towards the rear, FIG. 3 a cut-away plan on the left side, as viewed in the travel direction, of the sliding roof, with the transparent lid raised but not displaced, FIG. 4 a section along the successively stepped section line IV—IV in FIG. 3 with the roof closed, FIG. 5 a section similar to FIG. 4, but with the lid raised and displaced to the maximum towards the rear, FIG. 6 a section along VI—VI in FIG. 3, FIG. 7 a section along VII—VII in FIG. 3, FIG. 8 a section along VIII—VIII in FIG. 3, FIG. 9 a section along IX—IX in FIG. 3, FIG. 10 a perspective exploded view of the essential functional components of the sliding roof, FIG. 11 and FIG. 12 cut-away and enlarged plans on different positions of FIG. 13 the engagement situation between coupling element, entraining device and blocking recess, FIG. 14 an enlarged, cut-away section through a raising lever at the position of its connection with the raising device in the position of the components when the sliding roof is closed, FIG. 15 a section similar to FIG. 14, but in the position of the components illustrated when the lid is raised, FIG. 16 a cut-away section along XVI—XVI in FIG. 1, FIG. 17 a section along XVII—XVII in FIG. 3, FIG. 18 a section, to enlarged scale, substantially through the edge gap seal along the line XVIII—XVIII in FIG. 2.

FIGS. 1 and 2 illustrate the roof region of the cabin of a passenger automobile, the normal direction of travel being illustrated by arrow 1. In the forward region of the fixed vehicle roof 2, the roof opening 3 is situated, which can be closed by the lid 4. Reference 5 denotes the special edge gap seal 5, surrounding the roof opening and explained in more detail below, which seals the lid 4 in the closed position illustrated in FIG. 1 on all sides. Further details of the roof construction are not shown in FIGS. 1 and 2 for reasons of simplicity. As can be seen particularly from FIGS. 4 to 9, the roof opening 3 is surrounded by a vertical downward flange 6 of the automobile roof 2 extending around all four sides. The vertical downward flange is followed by a flange 7, likewise extending around all four sides, on which the roof frame referenced generally 8 is seated. The detachable connection between the flange 7 and the roof frame 8, moulded from plastics material, is provided by screws 9 passing from below through the flange 7, which engage into integrally formed threaded bushings 10 of the roof frame 8, as shown by the example of one of these screwed connections in FIG. 6.

The roof frame 8 consists of a lower part 11 with integrally formed water channel 12 extending around all four sides and of an upper part 13, engaging form-fittingly with the lower part 11 by integrally formed projections and depressions. Lower part 11 and upper part 13 are, in the example illustrated as can be seen from FIG. 6, connected together by screws 14, which engage into threaded bushings 15 integrally formed in the upper part 13. Lower part 11 and upper part 13 of the roof frame 8 are moulded from a thermoplastics material.

As can be seen particularly from FIGS. 6–9, a peripheral projection 16 of the lower part 11 separates the water channel 12 from the upper part 13 and all the functional components to be explained later. The aforementioned figures illustrate also the dividing between lower part 11 and upper part 13 of the roof frame 8 in a horizontal plane, which is situated substantially in the region of the cable channels. This horizontal dividing plane is represented by the mutually facing surfaces 17 of the lower part 11 and 18 of the upper part 13 (FIG. 10). These surfaces 17 and 18 are adjoined respectively by cylindrically shaped channel surfaces 19, 20, which each form one guide channel 21 (FIG. 8) in the region of the frame lateral components when lower part 11 and upper part 13 are joined together. The guide channel 21 on the left side of the roof, as referred to the travel direction arrow 1 in FIGS. 1 and 2, houses the left threaded cable 22 slidably guided therein, which is not drawn only in FIG. 8. The right threaded cable 23, situated on the right side of the roof, can be seen in FIGS. 3, 8 and 9 solely in the form of its free end, which is slidably seated in a channel 24 formed in the lower part 11 and is covered by the upper part 13. On the right side of the frame, the arrangement is to opposite hand, the axis of symmetry being through the longitudinal central plane of the automobile. In the following description only those functional parts that are situated on the left side of the roof will be explained, because the parts seated on the right side of the roof are constructed and arranged to opposite hand. The channel surfaces 19 and 20 are, as viewed in cross-section, not continued around a full semi-circle, so that between the opposite surfaces 25 and 26 adjoining thereto of lower part 11 and upper part 13 respectively, a slit 27 (FIGS. 7 and 8) is formed, through which penetrates an entraining device 28 (FIG. 9) fixed to the threaded cable 22, the form and function of which entraining device will be discussed in greater detail below.

As can be seen from FIG. 16, in the longitudinal central plane of the automobile there is a drive casing 29 integrally formed into the lower part 11 of the roof frame 8, in which casing a crank pin 30 is journalled rotatable but axially immovable. At the upper end of the crank pin 30 a drive pinion 31 is non-rotatably keyed, which pinion is in driving engagement with the threaded cables 22 and 23. An operating crank 33 is fixed to the head 32, projecting downwards out of the drive casing 29, of the crank pin 30. Rotations of the operating crank 33 and thus of the drive pinion 31 cause displacements in the manner of toothed racks in opposite directions of the threaded cables 22 and 23. This drive system has long been known for sliding roofs and does not form part of the subject of this invention. Instead of a hand drive, an electric drive for this drive system may also be provided.

In the region of the lateral components of the roof frame 8, its upper part 13 constitutes the lateral guide rails. For this purpose, on each side, a back-cut guide rib 34, hook-shaped in cross-section, is integrally formed on the upper part 13. This guide rib extends rectilinearly over the lateral component of the upper part 13, as can be seen from FIG. 3. The horizontal guide surfaces adjacent at left and right to the guide rib 34 and preferably lying in one plane (FIG. 7) are also a constituent of the guide rail and constitute guiding and seating surfaces for the slide rail 37, as can be seen particularly clearly from FIGS. 6 and 8.

For explaining the basic construction of the slide rail 37, reference will first be made to FIG. 10. As can be seen here, the slide rail 37 possesses substantially the form of an elongated profile member. Essential guiding element for the slide rail 37 is a downwardly open, back-cut guide groove 38, which is designed to accept the guide rib 34 on the upper part 13 of the roof frame 8 with little play. The guide groove 38 does not have to extend over the entire length of the slide rail 37, but it is indeed sufficient to provide a central opening 39, leaving two outer guide groove longitudinal zones.

At its forward end, the slide rail 37 carries two hinge eyes 40, which are joined together with a corresponding hinge eye 41 of the raising lever 42, to be explained below, by means of a hinge pin 43 to constitute a hinge which, in co-operation with a hinge situated correspondingly and to opposite hand on the right side of the lid, constitute the horizontal pivot axis oriented transversely to the direction of travel. In the rear zone of the slide rail, a cylindrical bearing bore 44 is formed, which seats rotatably an externally cylindrical threaded nut 45 of corresponding diameter.

At the lower end of the threaded nut 45 is an integrally formed pinion 46, which bears from below against the slide rail 37 (FIG. 6) and is in driving engagement with the threaded cable 22. The threaded nut is secured against axial displacement by a snap ring 47, which engages into an annular groove 48 of the threaded nut 45 and bears against the upper surface of the slide rail. In the region of the threaded nut 45, the slide rail 37, as seen at 49 in FIG. 6, is furnished with a projection 49 for achieving a large bearing length for the threaded nut 45, which projection bears against the upper part 13 of the roof frame 8 and therefore guides the slide rail 37 additionally on the upper part 13 during longitudinal displacements. In the central region, the slide rail 37 possesses also a cylindrical bearing bore 50 for the pivot bearing of a coupling element 51, to be explained in more detail below.

The raising lever 42, articulated by the described hinge assembly to the slide rail 37, is so adapted in its form to the slide rail that it rests upon the slide rail when the sliding roof is closed, as can be seen from FIGS. 4 and 9. For this purpose it possesses in particular a pressed out zone 52 for receiving the upper end of the threaded nut 45. For fixing the lid 4, two area zones 53 and 54, spaced apart and depressed relative to the main plane of the raising lever, are provided on the raising lever 42, in each of which zones a fixing bore 55 is situated (FIG. 10). Opposite to the bearing bore 50 in the slide rail 37 there is an aperture 56 in the raising lever 42, for receiving the upwardly projecting portion of the coupling element 51, when slide rail 37 and raising lever 42 bear one against the other (FIG. 9).

On the raising lever 42 a hook-like, downwardly oriented stop 57 is also disposed, which engages beneath the slide rail 37 in the manner visible in FIG. 9 and co-operates with a corresponding stop 58 of the slide rail to limit the maximum possible raising movement of the lid 4. Opposite to the area zone 53 of the raising lever 42 there is a cut-out 59 in the slide rail 37, which receives the area zone 53 of the raising lever, as indicated in FIGS. 4 and 5. The rear area zone 54 is located behind the adjacent end 60 of the slide rail 37 (FIG. 4).

The lid 4 is, in the example shown, constructed as a panel adapted to the roof curvature and made from transparent material and is fixed adjustable in height in the manner now described on the raising levers 42. At each side of the lid, opposite to the fixing bores 55 in the raising lever 42, two threaded pins 61 are fixed by gluing to the lower face of the lid through the agency of mounting plates 62 fitted to the threaded pins 61. Onto the threaded pins 61, elastic, height-adjusting elements in the form of buffers 63 of elastomer material, which possess a through bore 64 (FIG. 10) for this purpose, are pushed on. The elastic buffers 63 bear against the area zones 53 and 54 of the raising lever 42, preferably self-locking adjusting nuts 65 being screwed onto the threaded pins 61 penetrating through the fixing bores 55. In this manner the lid 4 is connected with the raising levers 42 at a total of four positions separated one from another. The height adjustment of the lid can be carried out very simply in that the adjusting nuts 65 are screwed up to greater or lesser extent on the threaded pins 61, with accompanying elastic deformation of the buffers 63. In this way the lid 4 can be exactly adjusted to the height of the fixed automobile roof 2.

For explaining the lid raising device, reference will now be made to FIGS. 4-6 in conjunction with FIG. 10. The raising device consists essentially of the threaded nut 45, constructed and journalled in the described manner, and of a lifting element in the form of a threaded pin 66 screwed into the threaded nut. This threaded pin 66 is connected with its free end non-rotatably with the raising lever 42 in the manner now described. For this purpose the threaded pin possesses a stepped down pin end 67, which engages into a bore 68 situated in the pressed-out zone 52 of the raising lever 42. Above the bore 68 the pin end 67 is deformed to a rivet head 69. To provide a compensation for pivoted travel distance, the bore 68 and the rivet head 69 are constructed in the manner shown in FIGS. 14 and 15, in order that angular movements between the threaded pin 66 and the raising lever 42 shall be possible. For this purpose the raising lever 42 possesses, in the region of its pressed-out zone 52, a spherical cup-shaped depression 70, in the centre of which there is a bore 68. To prevent a rotary movement of the threaded pin 66 inside the bore 68 the bore 68 can be slit-shaped, while the neck portion 71 formed from the pin end 67 is furnished with flattened surfaces (not illustrated) bearing against the walls of the slit. The surface 72 of the head 69 bearing against the depression 70 is likewise spherically cup-shaped, but convex. The upper end of the threaded pin 65 may also have a corresponding concave curvature. The described fixing of the threaded pin 65 to the raising lever should take place with as little play as possible for comparatively sluggish relative pivotings, in order that the three-member construction element, consisting of slide rail 37, raising lever 42 and raising device 45, 46, shall possess high stiffness even when the sliding lid is raised. Since the threaded pin 65 is fixed non-rotatably to the raising lever 42, rotational movements of the threaded nut 45 in one or the other direction lead to an extension or retraction of the threaded pin, which does not participate in the rotary movement, out of or into the threaded nut, with the result that the raised angle of the raising lever 42 and of the lid 4 connected therewith is changed.

The coupling element 51 engages with a cylinder stub 73 (FIG. 10) pivotally into the bearing bore 50 of the slide rail 37. The fixing of the coupling element 51 to the slide rail 37 is provided by means of a set screw 74, screwed into the cylindrical stub 73. The coupling piece is constructed as a two-armed lever, which is pivotally journalled about the axis formed by the cylinder stub 73. On each arm of the two-armed lever there is a hook-shaped projection 75, 76 respectively, oriented towards the threaded cable 22. Mutually facing surfaces 77, 78 respectively of the hook projections 75 and 76 are situated in the movement path of the rectangularly shaped entraining device 28. Between the two surfaces 77 and 78, two actuating surfaces 80 and 81, meeting obtuse-angled at an apex 79, are provided, each of which surfaces belongs to one of the two arms of the two-armed lever. Opposite to the hook projection 76 in the closed position of the sliding roof a blocking recess 82, designed in its form for accepting the hook projection 76, is situated in the upper part 13 of the roof frame 8. The coupling element 51 is biased in the direction of engagement into the stationary blocking recess 82 by a stirrup spring 83, which can be formed in one piece with the coupling element 51, as can be seen from FIGS. 3 and 10. The stirrup spring bears, for this purpose, against a projecting surface 84 of the lower part 11 of the roof frame 8. The hook projection 76 possesses a run-on surface 85, which co-operates with the outer corner 86 of the blocking recess 82 situated in the direction of opening travel of the lid. The rectangular entraining device 28 is aligned with its free, longer rectangle side 87 parallel to the threaded cable 22 and, of course, also, to all the guide surfaces of the guide rail constituted by the upper part 13 of the roof frame 8. Furthermore, the arrangement is such that the entraining device 28 projects sufficiently above the upper part 13 for the rectangle side 87 of entraining device 28 to be able to bear each time against one of the actuating surfaces 80 and 81.

For explaining the functions of the sliding roof of this invention, reference is now made basically to FIGS. 11–13 in conjunction with FIG. 3. Initially it is assumed for this purpose that the lid 4 is situated in its closed position shown in FIG. 1. The entraining device 28 is here situated approximately in its position shown in FIG. 3 in dot-and-dash in the region of the forward transverse component of the frame. When the operating crank is rotated in one direction which corresponds to a displacement of the threaded cable 22 in the frame lateral component in the direction opposite to travelling, the threaded cable 22 displacing towards the rear in the manner of a toothed rack in the guide channel 21 drives the pinion 46 in the direction of arrow 88 in FIG. 3, with the result that the threaded pin 65, previously fully screwed into the threaded nut 45, executes an upwardly oriented lifting movement and raises the lid 4. At the end of the raising movement, limited by the stops 57 and 58, the entraining device 28 has travelled out of the starting position shown in dot-and-dash line into the position shown in broken line in FIG. 3. This position is also seen in FIG. 12. From FIG. 11, the relative position of entraining device 28 and coupling element 51 just before completion of the raising movement or just before commencement of the displacement movement can be seen. The entraining device 28, entering the drawing from the left, as actuation of the drive device is continued strikes with its right corner 89 on the right-hand actuating surface 81, situated adjacent to the apex 79, of coupling element 51, causing the coupling element 51 to pivot about the axis of its cylindrical stub 73 counter clockwise, until the actuating surface 81 bears against the rectangle side 87. The hook projection 76 is here also partially pulled out of the blocking recess 82. The rectangle side 87 now slides along the actuating surface 81 until the entraining device surface 90 (FIG. 11) strikes against the surface 78 of the hook projection 76. This position, shown in FIG. 12, marks the commencement of the sliding movement of the lid 4. Further actuation of the drive device now leads to the entraining device 28 entraining the coupling element 51 and thereby also, of course, the slide rail 37 and all components connected therewith via the hook projection 76, towards the right in the drawing. Immediately after commencement of the opening displacement of the lid 4, the run-on surface 85 of the hook projection 76 comes into contact with the external corner 86 of the blocking recess 82, with the result that, during continued displacement, the coupling element 51 pivots further counter clockwise, the actuating surface 81 also lifting off the rectangle side 87, whereas the actuating surface 80 approaches the rectangle side 87 until it bears against it. The hook projection 76 is now fully swung out of the blocking recess 82. With continuing opening displacement, entraining now continues via the right corner 89 of the entraining device 28, which bears against the surface 78 of the hook projection 76. The opening displacement can now continue infinitely variably until the end 60 of the slide rail 37 strikes against the projection 16 of the lower part 11 (FIG. 5). This position corresponds to the maximum opening displacement of the lid 4, as indicated also diagrammatically in FIG. 2. During the displacement of the lid 4, the pinion 46 is not rotated by the threaded cable 22, because the slide rail 37 which journals the pinion 46 participates in the displacement synchronously with the threaded cable 22.

For the closure displacement of the raised lid 4, the operating crank 33 is rotated in the opposite direction, causing the threaded cable 22 to displace towards the left in FIG. 3. At the commencement of the closure displacement, the entraining device 28 travels a very short distance between the surfaces 77 and 78 of the coupling element 51 towards the left, the right-hand corner 89 of the entraining device 28 lifting off the surface 78 and the left-hand corner 91 of the entraining device 28 coming to bear against the surface 77 of the hook projection 75. The position of the components reached at this instant is shown in FIG. 13. During the closure displacement which now follows entraining of the coupling element 51 and thus of the lid 4 as a consequence of the bearing of the left corner 91 on the surface 77 takes place. Towards the end of the closure displacement, the hook projection 76 penetrates, due to the force of the stirrup spring 83 acting upon it and accompanied by pivoting of the coupling element 51 clockwise about the axis of the cylinder stub 73, into the blocking recess 82, the run-on surface 85 sliding over the external corner 86 of the blocking recess 82. Furthermore, the actuating surface 80 lifts off the rectangle side 87, while the actuating surface 81 comes to bear against the rectangle side 87. As a result the hook projection 75 releases with its surface 77 the left-hand corner 91 of the entraining device 28, so that the entraining device 28 can now displace towards the left relative to the coupling element 51. As soon as the right-hand corner 89 of the entraining device 28 has reached the apex 79, the stirrup spring 83 presses the hook projection 76 completely into the blocking recess 82, causing the displacement movement of the lid 4 to be terminated. The lid 4 is now situated in its forward position, but still adopts its maximum raised orientation. Since coupling element 51 and entraining device 28 are now decoupled, a continuation of the rotary actuation of the operating crank 33 leads to a rotation of the pinion 46 in the direction of arrow 92 in FIG. 3, causing the threaded pin 66 to be screwed once again into the threaded nut 45, so that the lid 4 pivots infinitely variably towards its closed position, until finally it has reached the position shown in FIGS. 1 and 4. In FIG. 4, the threaded cable 22, which otherwise would be seen in this section, has not been shown in order to simplify the drawing.

The roof frame lower part 11 possesses, at its edge towards the vertical downward roof flange 6, an upwardly oriented rib 93 and a downwardly oriented rib 94 adjoining the outer wall of the rib 93. The ribs 93 and 94 constitute together a fixing flange extending around all sides of the frame for the edge gap seal 5 fixed thereon, the arrangement of which can be seen in FIG. 18. In the other figures the edge gap seal 5 is not shown in order to simplify the drawings. For fixing the edge gap seal, this fits with a corresponding, not referenced groove, around the rib 93 and engages with a hook-shaped projection 95 around the rib 94. At the projection 95 there is also a continuation 96, shown in broken line, which after the edge gap seal has been clamped between the frame lower part 11 and the flange 7 of the automobile roof, adopts the form indicated in full lines.

The edge gap seal is constituted as a self-upstanding hollow profile, the wall regions 97 and 98 of which, towards the fixing flange 93, 94 and the roof frame lower part 11, are formed thick-walled. The wall region 98 is adjoined by a downwardly oriented, tapering projection 99, which bears against the outer lateral wall of the water channel 12. The wall region 97 terminates in a tapered sealing lip 100, which in the assembled state bears sealingly onto the fixed automobile roof 2 and, in the unassembled state, adopts approximately the position shown in broken line. The sealing lip 100 and the projection 99 are adjoined by outer, thin-walled and therefore easily deformable wall regions 101 and 102 which, in the uncompressed state, are bulged outwards somewhat in the form of a roof as viewed in cross-section. The outer roof surface 103, adjoining the sealing lip 100, here forms a wind deflecting surface, which extends, starting from the sealing lip 100, obliquely upwards to a ridge zone 104. The ridge zone 104 continues into the inner roof surface 105, from which sealing ribs 106 project. The thick-walled wall regions 97 and 98 enclose an obtuse angle and, together with the thin-walled wall regions 101 and 102, bound the profile cavity 107.

The edge gap seal, moulded from an elastomer material, when the lid is closed as indicated in dot-and-dash lines in FIG. 18, adopts the position likewise shown in dot-and-dash lines. The outer roof surface 103 now lies approximately in the plane of the fixed roof surface 2 and of the lid 4, whereas the inner roof surface is situated substantially underneath the lid 4 and bears with its sealing ribs 106 onto the edge zone of the lid. The ridge zone 104 bears sealingly against the edge surfaces of the lid. During raising movements and opening displacement movements, the edge gap seal raises itself, in the zones vacated by the lid 4, into the position illustrated in full lines in FIG. 18 and constitutes, with its wind deflector-like, inclined external roof surface 103, a wind deflector device extending all around when the roof is opened (FIG. 2).

As can be seen from FIGS. 3 and 17, downwardly inclined water outlet pipes 108 are connected to the water channel 12 at the four corners of the roof frame 8 in known manner.

We claim:

1. Sliding roof for automobiles comprising a raisable lid associated with a roof opening, which lid is pivotally journalled in the region of its forward edge about horizontal axis oriented transversely to the direction of travel, is slidably supported on lateral guide rails in the forward third of its length and is thereby displaceable in the raised position partly over the rear, fixed roof surface while maintaining its raised angle, a raising device consisting of a threaded telescopic device and participating in displacements being provided in the region of the support at each side of the lid, the threaded nut of which is connected in rotationally locked manner with a pinion coaxial therewith, which is in engagement with the threaded cable, displaceably mounted in tension and compression transmitting manner, of a drive device, characterized in that, for supporting the lid, on each side of the lid a slide rail engaging displaceably with the guide rail is provided, the forward end of which is pivotally connected to form the horizontal axis oriented transversely to the direction of travel with a raising lever, disposed in the direction of the slide rails, to which lever the lid is fixed, and at the rear end of which the threaded nut of the raising device is rotatably journalled about a vertical axis, the lifting element of the raising device being connected with the raising lever, and in that, on the slide rail, a coupling element is pivotally mounted, which is situated with actuation surfaces in the movement part of an entraining device connected with the threaded cable and, in the forward position of the lid, engages into a stationary blocking recess.

2. Sliding roof according to claim 1, wherein said guide rails are constructed as the upper part of a roof frame divided in a horizontal plane in the region of the guide channel for the threaded cables and surrounding the roof opening, and possess, on their guiding and bearing surface for the slide rails, back-cut guide ribs for engagement with correspondingly back-cut guide grooves situated on the slide rails.

3. Sliding roof according to claim 2, wherein said upper part and lower part of the roof frame are connected together in interlocking and preferably detachable manner by integrally formed projections and depressions, a peripheral projection of the lower part also separating the upper part and all functional components from a peripheral water channel, integrally formed in the lower part and situated between the edge of the roof opening and the peripheral projection.

4. Sliding roof according to claim 2 wherein said upper and lower parts of the roof frame are formed from plastics material.

5. Sliding roof according to claim 1 wherein said lid is fixed to each of the two raising levers, at two positions disposed at a distance from each other, through the intermediary of elastic height adjustment elements.

6. Sliding roof according to claim 5, wherein said elastic height adjustment elements are constituted as buffers of an elastomer material, each of which is traversed by a threaded pin fixed to the lid, which pin is conducted through a corresponding note in the raising lever and carries an adjusting nut bearing against the raising lever on the side remote from the buffer.

7. Sliding roof according to claim 1 wherein said threaded nut of the raising device has a rotationally symmetrical external periphery, can be rotatably inserted into a corresponding bore of the slide rail, carries at its lower end the preferably integrally formed pinion engaging with the associated threaded cable and bearing from below against the slide rails, and is secured at its upper end against axial displacement relative to the bore.

8. Sliding roof according to claim 1 wherein said lifting element of the raising device is a threaded pin, capable of being screwed in the threaded nut, the free end of which pin is passed through a bore of the raising lever and non-rotatably fixed thereto.

9. Sliding roof according to claim 8, wherein said free end of the threaded pin is stepped, penetrated with a neck portion of smaller diameter through the bore of larger diameter of the raising lever and terminates in a head, which bears against the raising lever in order to achieve a limited, sluggish pivotal capability.

10. Sliding roof according to claim 9, wherein said raising lever possesses, in the region of the bore, a spherical, cup-shaped depression, against which bears on the one side a correspondingly formed end face of the threaded pin and on the other side a correspondingly formed surface of the head.

11. Sliding roof according to claim 1 wherein said raising lever engages in hook-like manner beneath the slide rail with a stop, opposite to which is a stop on the slide rail for limiting the maximum raised travel.

12. Sliding roof according to claim 1 wherein said coupling element is spring-loaded in the direction of engagement into the stationary blocking recess.

13. Sliding roof according to claim 1 wherein said coupling element engages from below with a cylindrical stub into a corresponding bore of the slide rail, pivotally about an axis parallel to the threaded nut of the raising device, and is constructed as a two-armed lever, which possesses at each of the two ends a hook projection facing towards the associated threaded cable, the mutually facing surfaces of the hook projections being situated in the movement path of the rectangularly spaced entraining device, fixed to and parallel with the threaded cable at one of its longer rectangle sides, and enclosing between them two actuating surfaces meeting obtuse-angled at an apex, of which one actuating surface on each occasion bears in two possible pivoted positions of the coupling element when the coupling element is engaged with the entraining device, against the free, longer rectangle side of the entraining device.

14. Sliding roof according to claim 13, wherein said two hook projections is formed to engage in locking manner into the blocking recess and possesses a run-on surface, with which is associated the external corner of the blocking recess situated in the direction of opening of the lid, for the purpose of pivoting the coupling element.

15. Sliding roof according to claim 1 wherein said one blocking recess is disposed on each side of the lid in the upper part of the roof frame.

16. Sliding roof according to claim 1 wherein said coupling element a stirrup spring is fixed, which bears, at least opposite to the blocking recess, against a projecting surface of the roof frame lower part parallel to the direction of sliding.

17. Sliding roof according to claim 1 wherein said roof frame lower part is furnished, at its edge towards the edge of the roof opening, with a peripheral fixing flange for a peripheral edge gap seal fixed in clamping manner thereon.

18. Sliding roof according to claim 17, wherein said edge gap seal is a hollow profile formed from elastomer material, the wall zones of which facing towards the fixing flange and the roof frame are formed thickened, whereas the outer wall regions facing towards the lid are thin-walled and, in the uncompressed state, are sprung outwards in a roof-shape in cross-section, the outer roof surface adjoining with a sealing lip onto the fixed roof surface of the automobile and, from here onwards, extending in the manner of a wind deflector obliquely upwards to a ridge zone, which is followed by the inner roof surface descending to the roof opening.

19. Sliding roof according to claim 17 wherein when said lid is closed, the edge gap seal is pressed in by the lid, the outer roof surface being situated approximately in the plane of the fixed roof surface of the automobile and of the lid, the ridge zone bearing against the edge surfaces of the lid and the inner roof surface bearing against the underside of the lid in the lid edge region.

20. Sliding roof according to claim 19, wherein said inner roof surface possesses peripheral ribs or the like, which bear from below against the closed lid.

* * * * *